(12) United States Patent
Schlipf

(10) Patent No.: US 9,063,017 B2
(45) Date of Patent: Jun. 23, 2015

(54) TEMPERATURE SENSOR WITH CARRIER PLATE

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 87 days.

(21) Appl. No.: 13/370,465

(22) Filed: Feb. 10, 2012

(65) Prior Publication Data

US 2012/0250727 A1    Oct. 4, 2012

(30) Foreign Application Priority Data

Mar. 28, 2011 (DE) ...................... 20 2011 004 481 U

(51) Int. Cl.
*G01K 7/00* (2006.01)
*G01K 1/14* (2006.01)

(52) U.S. Cl.
CPC ........................................ *G01K 1/14* (2013.01)

(58) Field of Classification Search
CPC ..................................................... G01K 1/14
USPC ............ 374/208, 199, 200, 205–207, E1.011, 374/E1.018–E1.019, 163, 179, 185, 141, 374/146, 147, 149
See application file for complete search history.

(56) References Cited

U.S. PATENT DOCUMENTS

| | | | |
|---|---|---|---|
| 3,317,353 A | * | 5/1967 | Bingham ....................... 136/233 |
| 3,333,871 A | * | 8/1967 | Abbiati et al. .................. 285/45 |
| 3,533,288 A | * | 10/1970 | Franck .......................... 374/120 |
| 8,869,639 B2 | | 10/2014 | Pohle et al. |
| 2009/0296782 A1 | | 12/2009 | Nishiyashiki |
| 2012/0017708 A1 | | 1/2012 | Pohle et al. |

FOREIGN PATENT DOCUMENTS

| | | |
|---|---|---|
| CH | 689875 A5 | 12/1999 |
| DE | 19 48 042 A1 | 4/1970 |
| DE | 199 17 066 A1 | 10/2000 |
| DE | 19917066 * | 10/2000 |
| DE | 10 2009 000597 A1 | 8/2010 |
| DE | 102009000597 A1 | 8/2010 |
| GB | 2 128 743 A | 5/1984 |
| GB | 2128743 A | 5/1984 |
| JP | 2005 003 550 A | 1/2005 |

OTHER PUBLICATIONS

Chinese Office Action of Oct. 10, 2014.

* cited by examiner

*Primary Examiner* — Lisa Caputo
*Assistant Examiner* — Janice M Soto
(74) *Attorney, Agent, or Firm* — McGlew and Tuttle

(57) ABSTRACT

A temperature sensor (1) has a sensor element (2), a carrier plate (4) and a contact surface and at least one electric feed line (3), which is routed, starting from the sensor element (2), through an opening (5) in the carrier plate (4). A guide element (8), through which the electric feed line (3) is routed such that at least the end of the routed section of the electric feed line, which end faces the sensor element, is located at a spaced location from each section of the carrier plate in the direction at right angles to the contact surface and is secured against displacement in each direction except in the directions in which the electric feed line (3) extends, is arranged on the side of the carrier plate (4) located opposite the contact surface or on a front side of the carrier plate (4).

22 Claims, 1 Drawing Sheet

TEMPERATURE SENSOR WITH CARRIER PLATE

CROSS REFERENCE TO RELATED APPLICATIONS

This application claims the benefit of priority under 35 U.S.C. §119 of German Utility Model 20 2011 004 481.5 filed Mar. 28, 2011, the entire contents of which are incorporated herein by reference.

FIELD OF THE INVENTION

The present invention pertains to a temperature sensor with a carrier plate with a contact surface and at least one electric feed line, which is routed, starting from the sensor element, through a hole in the carrier plate.

BACKGROUND OF THE INVENTION

Such temperature sensors are frequently used to determine the near-surface temperature of heated components. A sensor element, which is arranged on a carrier plate, is typically inserted in this case into a recess of the component and fastened to the component with a fastening element arranged on the carrier plate. To supply the sensor element and/or to read measured results, the sensor element is connected to a routed electric feed line, starting from the sensor element through the carrier plate, onto the side of said carrier plate facing away from the component to be monitored, and is routed farther from there essentially in parallel to the course of the carrier plate.

It was found during the operation of such temperature sensors with carrier plate that the electric feed line is often exposed in this embodiment to kinking, which may lead to it being damaged. A temperature sensor with carrier plate, in which this effect is reduced by using a carrier plate with sections that extend in two mutually offset planes, is known from CH 689 875 A5. One of the sections of the carrier plate forms the contact surface, and the other is surrounded, together with the electric feed line, by a guide element, which is then pressed to fix the feed line to the carrier plate.

However, the problem arises in the device disclosed there that motion of the electric feed line in the plane of the carrier plate cannot be ruled out with sufficient certainty especially during the operation of the holding mandrel, as a result of which a load is exerted on the electric feed line. Moreover, the guide element must be made relatively large because it must enclose not only the electric feed line but also a section of the carrier plate, which is especially difficult to reconcile with the actually desired compact design because larger kink protection springs are correspondingly needed as a result as well. Finally, the efficiency of manufacture also leaves something to be desired in this design, because the optimal geometry of the carrier plate is usually different for different components to be monitored. However, the prior-art design of the temperature sensor with carrier plate also absolutely requires an adaptation of the guide element to the particular conditions, such as a variation of the materials and geometries used for the electric feed lines, for any variation of the design of the carrier plate, especially in terms of the thickness of the carrier plate, which is in conflict with efficient manufacture.

SUMMARY OF THE INVENTION

An object of the present invention is consequently to provide a temperature sensor with carrier plate, which said temperature sensor can be manufactured efficiently and in a cost-effective manner, and which has a compact design, and in which the feed line is better protected against kinking and displacement in the plane of the carrier plate.

The temperature sensor according to the present invention has a sensor element, a carrier plate with a contact surface and at least one routed electric feed line, starting from the sensor element, through an opening in the carrier plate. It is essential for the present invention that a guide element, through which the electric feed line is routed such that at least the end of the section of the routed electric feed line, which said end faces the sensor element, is located at a spaced location from the section of the carrier plate in the direction at right angles to the contact plate (which does not happen, e.g., when this end of the routed section is in contact with the carrier plate) and is secured against displacement in any direction except in the directions in which the electric feed line extends, is arranged on the side of the carrier plate located opposite the contact surface or on a front side of the carrier plate. The distance condition is preferably also met for the end of the electric feed line facing away from the sensor element.

These conditions are met, for example, if the guide element is a metal block, which has a hole as a guide (guide portion), which passes through the metal block in parallel to a direction in which the contact surface of the carrier plate extends and if the electric feed line is routed through this hole. However, these conditions may also be met, e.g., with the use of a guide groove as the guide portion.

The electric feed line routed in this manner can still be possibly displaced in two directions, namely, in the direction of the opening of the carrier plate and away from the opening of the carrier plate, which illustrates that two directions of extension are associated with an electric feed line.

It shall be explicitly pointed out for clarification that the distance in the direction at right angles to the contact surface of the carrier plate between the section of the routed electric feed line and the carrier plate may be different for different areas of the electric feed line. Even though the routed section of the electric feed line does preferably extend essentially in parallel to a direction in which the contact surface of the carrier plate extends, this is not absolutely necessary.

Since the guide element of such a design has a minimum distance between the surface of the carrier plate, which surface faces away from the heated component to be heated, and the routed area of the electric feed line and imposes this on the routed area of the electric feed line, it is ensured that kinking of the electric feed line is limited at the point at which it passes through the carrier plate. At the same time, a motion of the electric feed line, which may lead to chafing of the electric feed line at the kink point, is prevented from occurring especially effectively, because the opening, through which the electric feed line is routed, can be fully adapted to the diameter of said feed line, because no section of the carrier plate has to be additionally inserted into this opening.

At the same time, this distance offers, on the one hand, the possibility of providing a fixation of the electric feed line, which does not also include any sections of the carrier plate, and, on the other hand, the possibility of providing a kink protection spring, which may possibly be provided, with a smaller radius, both of which contribute to a substantially more compact design.

Furthermore, the concrete embodiment of the guide element in the temperature sensor with carrier plate according to the present invention is completely independent of the geometry of the carrier plate, so that an identical component can be used for all embodiments, which contributes to an especially efficient and cost-effective manufacture. Adaptation to the particular embodiment desired of the electric feed line in terms of the shape and course thereof can also be easily accomplished by adapting the direction of extension and the diameter of the hole or groove.

In an especially advantageous embodiment of the temperature sensor, the routed section of the electric feed line in the guide element is also secured against displacement in the directions in which the electric feed line extends. Not only does this prevent an increased load on the electric feed line at the edge of the opening through which it is led through the carrier plate, but it also avoids a repeated change in the kink or bending angle at this point, which may lead to fatigue fractures of the electric feed line.

This securing is possible in practice, for example, by fixing the routed section, which can be achieved especially if the routed section of the electric feed line is surrounded with a flexible insulating tubing, which increases the diameter of the electric feed line such that the routed section is routed clampingly in the guide element. However, other possibilities of bringing about fixation, e.g., by pressing, clamping or bonding, are conceivable as well.

Provisions are made in an especially preferred variant of the present invention for the section of the electric feed line, which extends between the opening in the carrier plate and the guide element, to have a first subsection, in the course of which the distance between the electric feed line and the carrier plate increases in the direction of the guide element, and a second subsection, in which the distance between the electric feed line and the carrier plate decreases in the direction of the guide element. It is ensured in this embodiment that buckling strains and tensile stresses are efficiently prevented from occurring at the point at which the electric feed line is routed through the opening in the carrier plate.

If it is further ensured that the maximum distance between the electric feed line and carrier plate is smaller than the height of the guide element relative to the carrier plate, the guide element can offer an at least partial shielding against a possible pressure load on the electric feed line, which in turn leads to a reduction of the risk of a buckling load at the point at which the electric feed line is routed through the opening in the carrier plate.

Provisions, which increase temperature resistance and hence also prolong service life, are made in another advantageous embodiment of the temperature sensor for the electric feed line to be mineral insulated at least in the area between the sensor element and guide element. Temperature sensors in which the sensor element has a contact point of two thermocouple legs consisting of different materials, which extend, at least in some sections, in the electric feed line and in which the electric feed line is mineral insulated at least in the area between the thermocouple legs, have proved to be especially useful in this connection.

In an especially preferred embodiment, the temperature sensor according to one of the above claims has a guide element with a tubular extension for being pushed over a kink protection spring. Buckling strains are thus prevented from acting on the electric feed line at the exit from the guide element.

Exemplary embodiments of the present invention will be explained in more detail below on the basis of figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
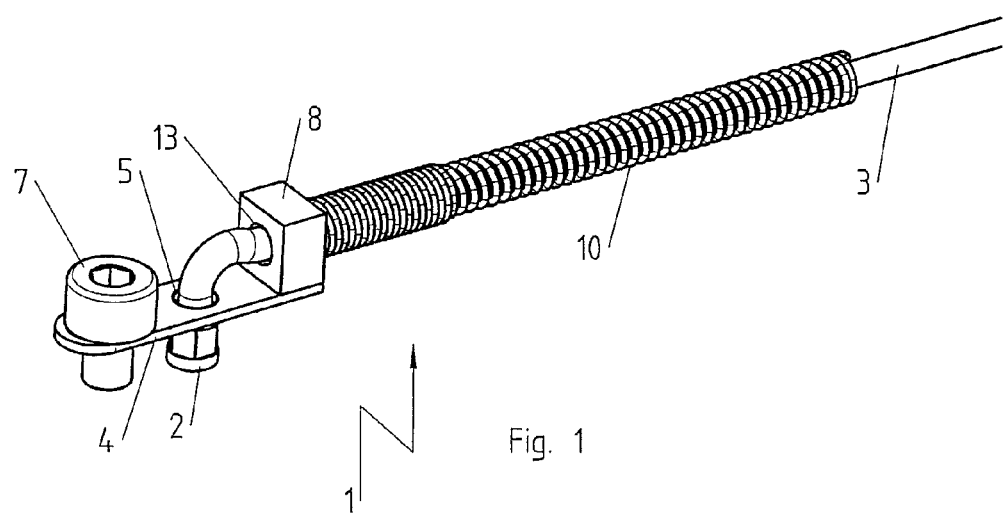
FIG. 1 is a perspective view of an exemplary embodiment of the present invention.

Referring to the drawings in particular, identical components of identical embodiments are designated by the same reference numbers in all figures.

FIG. 1 shows an exemplary embodiment for a temperature sensor 1 with carrier plate 4. Carrier plate 4 can be preferably fastened with a fastening means, with which the temperature sensor 1 can be fastened to the component, not shown, whose temperature shall be monitored. As an example of such a fastening means, which does not necessarily have to be a part of the temperature sensor, FIG. 1 shows a screw 7, which passes through an elongated hole 6, which is arranged in the carrier plate 4 and is visible in FIG. 2 only, and can be screwed into a corresponding thread of the component, not shown, whose temperature shall be monitored.

Furthermore, an opening 5, which extends from the side of the temperature sensor 1 facing the component to be monitored during the use of the temperature sensor 1, i.e., the contact surface of the carrier plate 4, to the side located opposite this carrier plate, runs through the carrier plate 4. A sensor element 2, which is connected by an electric feed line 3 routed through the opening 5 to a control and/or reading device, not shown, for the sensor element, is arranged on the side of the opening 5 facing the component to be monitored during the use of the temperature sensor 1.

A guide element 8 is arranged on the carrier plate 4, and may, for example, be welded, soldered or bonded there. The guide element 8 has, as can be recognized especially clearly from FIG. 2, a central hole 13, through which the electric feed line 3 is routed, so that the electric feed line 3 extends essentially in parallel to a direction in which the contact surface of the carrier plate 4 extends and at a spaced location from the carrier plate 4 and is secured against displacement in any direction except in the directions in which the electric feed line 3 extends.

In particular, it can be clearly recognized in both figures that the end of the routed section of the electric feed line 3, which end faces the sensor element 2, is located at a spaced location from each section of the carrier plate 4 in the direction at right angles to the contact surface. The distance in the direction at right angles to the contact surface between the end of the routed section of the electric feed line 3, which end faces the sensor element 2, and each section of the carrier plate 4 is designated by reference designation d in FIG. 2 to illustrate the significance of this essential feature. The level difference needed to avoid kinking problems in the sensor element-side end section of the electric feed line 3 relative to the level of the section of the carrier plate, which is in contact with the component to be monitored is consequently achieved by the guide element 8 arranged at or on the carrier plate 4 in such a way that only the electric feed line, which may possibly be surrounded by a shrinkdown plastic tubing, is fixed.

Figure 2:
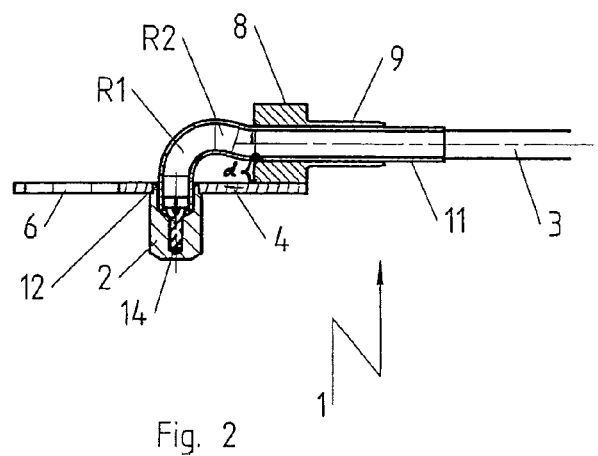
FIG. 2 is a cross sectional view through the exemplary embodiment from FIG. 1 with the kink protection spring removed.

Moreover, a flexible insulating tubing, 11, which surrounds the end section of the electric feed line 3 especially in the area of hole 13 and generates in this area a clamping action, which also brings about securing against displacement in the directions in which the electric feed line 3 extends, is provided in the embodiment of the present invention shown in FIGS. 1 and 2. As a consequence, a force acting on the electric feed line 3 on the side of the guide element 8 facing away from the sensor element 3 is absorbed by the guide element 8 and does not lead to a change in the course of the electric feed line 3 in the section between sensor element 2 and guide element 8.

In the embodiment shown in FIGS. 1 and 2, this section has, as can be recognized especially on the basis of FIG. 2, a first subsection R1, over the course of which the distance between the electric feed line 3 and the carrier plate 4 increases in the direction of the guide element 8, and a second subsection R2, in which the distance between the electric feed line 3 and the carrier plate 5 decreases in the direction of the guide element 8. A relaxed, kink-free routing of the electric feed line 3 can be ensured hereby.

On its side facing away from the sensor element 2, the guide element 8 has, furthermore, as can be recognized especially clearly in FIG. 2, a tubular extension 9, to which a kink protection spring 10, shown in FIG. 1 only, can be fastened by pushing over in order to prevent the elastic feed line 3 from kinking at its exit from guide element 8.

Moreover, further details concerning an advantageous arrangement of the sensor element 2 can be recognized in FIG. 2. Sensor element 2 has a tapered area 12, with which it is inserted into the opening 5 of carrier plate 4 and which has the diameter of opening 5. The mechanical connection between sensor element 2 and carrier plate 4 may be established, e.g., by a three-point laser welding, but, e.g., other types of welding or soldering, clamping, screwing in or bonding are possible as well. The electric feed line 3 with the flexible insulating tubing 11 optionally provided in this exemplary embodiment is inserted through the opening 5 and into a recess in sensor element 2, in which a conductor 14 of the electric feed line 3 is brought into electric contact with sensor element 2.

While specific embodiments of the invention have been shown and described in detail to illustrate the application of the principles of the invention, it will be understood that the invention may be embodied otherwise without departing from such principles.

LIST OF REFERENCE NUMBERS

1 Temperature sensor
2 Sensor element
3 Electric feed line
4 Carrier plate
5 Opening
6 Elongated hole
7 Screw
8 Guide element
9 Tubular extension
10 Kink protection spring
11 Flexible insulating tubing
12 Tapered area
13 Hole
14 Conductor
R1 First subsection
R2 Second subsection
d Vertical distance between electric feed line and carrier plate

What is claimed is:
1. A temperature sensor comprising:
   a sensor element;
   a carrier plate with a contact surface;
   an electric feed line, which is routed, starting from said sensor element, through an opening in said carrier plate; and
   a guide element arranged on a side of said carrier plate located opposite said contact surface or on a front side of said carrier plate, said electric feed line being routed through said guide element such that at least an end portion of a routed section of said electric feed line, which said end portion faces said sensor element, is located at a spaced location from each section of said carrier plate in a direction at right angles to said contact surface and said electric feed line is secured against displacement in each direction except in directions in which said electric feed line extends, said end portion extending from a position adjacent to said guide element to at least a position located at a spaced location from said guide element, wherein said end portion is located at a spaced location from said carrier plate at said position adjacent to said guide element, said guide element being a metal block with a hole, through which said routed section of said electric feed line is routed, wherein a portion of said routed section of said electric feed line is located in said hole, said block comprising a planar block bottom surface, said carrier plate comprising a planar top carrier plate surface, said planar block bottom surface engaging said planar top carrier plate surface, wherein said portion of said routed section of said electric feed line is located at a spaced location from said carrier plate.

2. A temperature sensor in accordance with claim 1, wherein said routed section of said electric feed line in said guide element is also secured against displacement in a direction in which said electric feed line extends.

3. A temperature sensor in accordance with claim 1, wherein a section of said electric feed line, which extends between said opening in said carrier plate and said guide element, has a first subsection, over a course of which a distance between said electric feed line and said carrier plate increases in a direction of said guide element, and a second subsection, in which the distance between said electric feed line and said carrier plate decreases in the direction of guide element, said first subsection being located adjacent to said guide element.

4. A temperature sensor in accordance with claim 1, wherein a maximum distance between said electric feed line and said carrier plate is smaller than a height of said guide element relative to said carrier plate.

5. A temperature sensor in accordance with claim 1, wherein said electric feed line is mineral insulated at least in an area between said sensor element and said guide element.

6. A temperature sensor in accordance with claim 1, wherein:
   said sensor element has a contact point of two thermocouple legs made of different materials, which extend at least in some sections in said electric feed line; and
   said electric feed line is mineral insulated at least in an area between said thermocouple legs.

7. A temperature sensor in accordance with claim 1, further comprising a kink protection spring wherein said guide element has a tubular extension pushed over said kink protection spring.

8. A temperature sensor in accordance with claim 1, wherein said guide element comprises a guide element surface, said guide element surface extending continuously, without interruption, about at least a portion of said routed section of said electric feed line, said guide element surface defining a guide element opening, wherein said at least said portion of said routed section is arranged in said guide element opening, said at least said portion of said routed section comprising a longitudinal axis, wherein said at least said portion of said routed section is fixed via said guide element such that said at least said portion of said routed section does not move in a radial direction with respect to said longitudinal axis, said at least said portion of said routed section being located at a spaced location from said carrier plate, wherein at least a portion of said guide element is located between said at least said portion of said routed section and said carrier plate.

9. A temperature sensor in accordance with claim 8, further comprising:
   a tubing surrounding said at least said portion of said routed section, at least a portion of said tubing being arranged in said guide element opening, said guide element surface being in direct contact with said at least said portion of said tubing, wherein said at least said portion of said routed section is also secured against displacement in a direction in which said electric feed line extends via said tubing and said guide element, said at least said portion of said tubing being located at a spaced location from said carrier plate.

10. A temperature sensor comprising:
    a sensor element;
    a carrier plate with a contact surface;
    an electric feed line connected to said sensor element and passing through an opening in said carrier plate; and
    a guide element arranged on a side of said carrier plate located opposite said contact surface, said guide element including a guide portion spaced a distance from said contact surface, said electric feed line being guided by said guide portion of said guide element such that a length of said electric feed line between said sensor element and said guide element is located at a spaced location from said carrier plate in a direction at right angles to said contact surface and is secured against displacement in each direction except in directions in which said electric feed line extends, said length of said electric feed line extending continuously, without interruption, from a first position to at least a second position, said first position being directly adjacent to said guide element, said second position being located at a position above said carrier plate, wherein said first position is located at a spaced location from said carrier plate, said guide element being a metal block with a hole as said guide portion, through which said length as a routed section of said electric feed line is routed, wherein a portion of said routed section of said electric feed line is located in said hole, said block comprising a planar block bottom surface, said carrier plate comprising a planar top carrier plate surface, said planar block bottom surface engaging said planar top carrier plate surface, wherein said portion of said routed section of said electric feed line is located at a spaced location from said carrier plate.

11. A temperature sensor in accordance with claim 10, wherein said routed section of said electric feed line in said guide element is also secured against displacement in a direction in which said electric feed line extends.

12. A temperature sensor in accordance with claim 10, wherein a section of said electric feed line, which section extends between said opening in said carrier plate and said guide element, has a first subsection, over a course of which a distance between said electric feed line and said carrier plate increases in a direction of said guide element, and a second subsection, in which the distance between said electric feed line and said carrier plate decreases in the direction of guide element, said first subsection being located directly adjacent to said guide element.

13. A temperature sensor in accordance with claim 10, wherein a maximum distance between said electric feed line and said carrier plate is smaller than a height of said guide element relative to said carrier plate.

14. A temperature sensor in accordance with claim 10, wherein:
    said sensor element has a contact point of two thermocouple legs made of different materials, which extend at least in some sections in said electric feed line; and
    said electric feed line is mineral insulated at least in an area between said thermocouple legs.

15. A temperature sensor in accordance with claim 10, further comprising a kink protection spring wherein said guide element has a tubular extension pushed over said kink protection spring.

16. A temperature sensor in accordance with claim 10, wherein said guide portion comprises a guide portion surface, said guide portion surface defining a guide element opening, at least a portion of said electric feed line being arranged in said guide element opening, wherein said guide portion surface extends continuously, without interruption, about said at least said portion of said electric feed line, said at least said portion of said electric feed line having a longitudinal axis, wherein said guide element fixes said at least said portion of said electric feed line such that said at least said portion of said electric feed line does not move in a radial direction with respect to said longitudinal axis, said at least said portion of said electric feed line being located at a spaced location from said carrier plate, wherein at least a portion of said guide element is located between said at least said portion of said electric feed line and said carrier plate.

17. A temperature sensor in accordance with claim 16, further comprising:
    a tubing surrounding said at least said portion of said electric feed line, at least a portion of said tubing being arranged in said guide element opening, said guide portion surface being in direct contact with said at least said portion of said tubing, wherein said at least said portion of said electric feed line is also secured against displacement in a direction in which said electric feed line extends via said tubing and said guide element, said at least said portion of said tubing being located at a spaced location from said carrier plate, wherein said at least said portion of said guide element is located between said at least said portion of said tubing and said carrier plate.

18. A temperature sensor comprising:
    a sensor element;
    a carrier plate with a contact surface;
    an electric feed line connected to said sensor element and passing through an opening in said carrier plate; and
    a guide element arranged on a side of said carrier plate located opposite said contact surface, said guide element being in direct contact with said carrier plate, said guide element including a guide portion spaced a distance from said contact surface, said guide portion comprising a guide portion surface, said guide portion surface defining a guide element opening extending from one side of said guide element to another side of said guide element, wherein said electric feed line is guided by said guide portion of said guide element such that a length of said electric feed line between said sensor element and said guide element is located at a spaced location from said carrier plate in a direction at right angles to said contact surface, said length of said electric feed line comprising at least a first portion of said electric feed line arranged in said guide element opening and at least a second portion of said electric feed line arranged adjacent to said guide element and said first portion of said electric feed line, wherein said first portion of said electric feed line and said second portion of said electric feed line are maintained at a spaced location from said carrier plate in said direction at rights angles to said contact surface via said guide element, said guide portion surface extending continuously, without interruption about said at least said first portion of said electric feed line, said at least said first portion of said electric feed line comprising a longitudinal axis, wherein said at least said first portion of said electric feed line and said at least said second portion of said electric feed line are fixed via said guide element such that said at least said first portion of said electric feed line and said at least said second portion of said electric feed line do not move in a radial direction with respect to said longitudinal axis.

19. A temperature sensor in accordance with claim 18, wherein said at least said first portion of said electric feed line is secured via said guide element against displacement in each direction except in directions in which said electric feed line extends, said guide element comprising a block structure, said block structure comprising a planar block bottom surface, said carrier plate comprising a top planar carrier plate surface, said planar block bottom surface being in direct contact with said top planar carrier plate surface.

20. A temperature sensor in accordance with claim 18, further comprising:
a tubing surrounding said at least said first portion of said electric feed line and said second portion of said electric feed line, at least a portion of said tubing being arranged in said guide element opening, said guide portion surface being in direct contact with said at least said portion of said tubing, wherein said at least said first portion of said electric feed line is secured against displacement in all directions, including a direction in which said electric feed line extends, via said tubing and said guide element, said at least said portion of said tubing being located at a spaced location from said carrier plate, wherein a portion of said guide element is located between said carrier plate and said at least said portion of said tubing, said electric feed line comprising a third portion, said third portion extending parallel to said carrier plate, said second portion of said electric feed line being located on one side of said guide element, said third portion being located on another side of said guide element, wherein said third portion is located adjacent to said guide element and said first portion of said electric feed line.

21. A temperature sensor comprising:
a sensor element;
a carrier plate with a contact surface;
an electric feed line, which is routed, starting from said sensor element, through an opening in said carrier plate; and
a guide element arranged on a side of said carrier plate located opposite said contact surface or on a front side of said carrier plate, said electric feed line being routed through said guide element such that at least an end portion of a routed section of said electric feed line, which said end portion faces said sensor element, is located at a spaced location from each section of said carrier plate in a direction at right angles to said contact surface and said electric feed line is secured against displacement in each direction except in directions in which said electric feed line extends, said end portion extending from a position adjacent to said guide element to at least a position located at a spaced location from said guide element, wherein said end portion is located at a spaced location from said carrier plate at said position adjacent to said guide element, said guide element comprising a guide element surface, said guide element surface extending continuously, without interruption, about at least a portion of said routed section of said electric feed line, said guide element surface defining a guide element opening, wherein said at least said portion of said routed section is arranged in said guide element opening, said at least said portion of said routed section comprising a longitudinal axis, wherein said at least said portion of said routed section is fixed via said guide element such that said at least said portion of said routed section does not move in a radial direction with respect to said longitudinal axis, said at least said portion of said routed section being located at a spaced location from said carrier plate, wherein at least a portion of said guide element is located between said at least said portion of said routed section and said carrier plate.

22. A temperature sensor comprising:
a sensor element;
a carrier plate with a contact surface;
an electric feed line connected to said sensor element and passing through an opening in said carrier plate; and
a guide element arranged on a side of said carrier plate located opposite said contact surface, said guide element including a guide portion spaced a distance from said contact surface, said electric feed line being guided by said guide portion of said guide element such that a length of said electric feed line between said sensor element and said guide element is located at a spaced location from said carrier plate in a direction at right angles to said contact surface and is secured against displacement in each direction except in directions in which said electric feed line extends, said length of said electric feed line extending continuously, without interruption, from a first position to at least a second position, said first position being directly adjacent to said guide element, said second position being located at a position above said carrier plate, wherein said first position is located at a spaced location from said carrier plate, said guide portion comprising a guide portion surface, said guide portion surface defining a guide element opening, at least a portion of said electric feed line being arranged in said guide element opening, wherein said guide portion surface extends continuously, without interruption, about said at least said portion of said electric feed line, said at least said portion of said electric feed line having a longitudinal axis, wherein said guide element fixes said at least said portion of said electric feed line such that said at least said portion of said electric feed line does not move in a radial direction with respect to said longitudinal axis, said at least said portion of said electric feed line being located at a spaced location from said carrier plate, wherein at least a portion of said guide element is located between said at least said portion of said electric feed line and said carrier plate.

* * * * *